Dec. 14, 1948.  H. R. FORSMARK  2,456,497
MICROMETER BORE GAUGE
Filed March 1, 1947
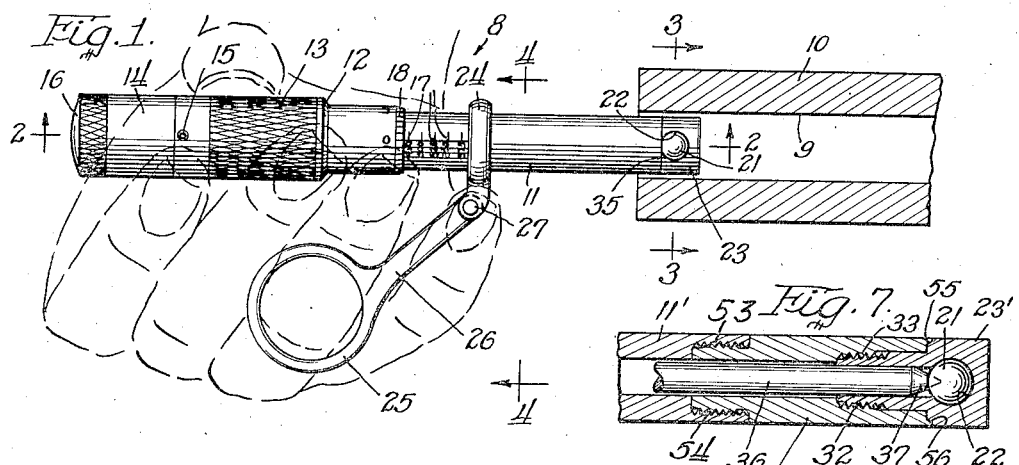
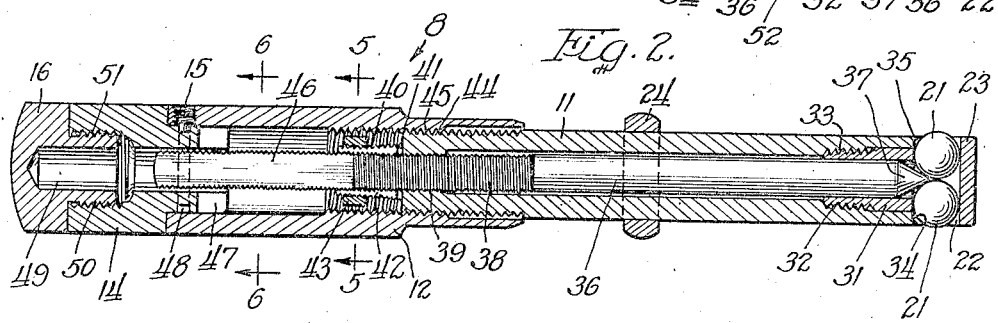
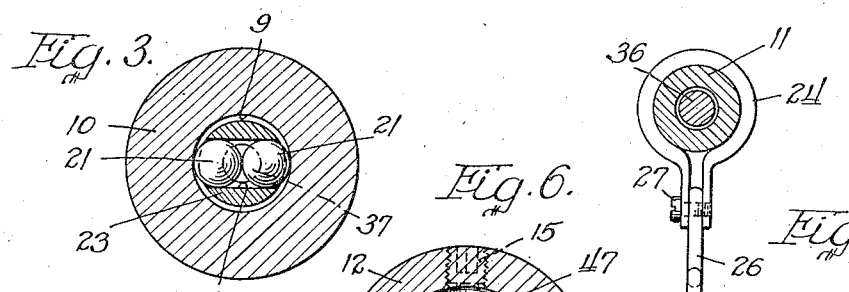
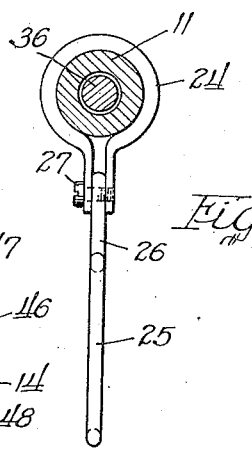
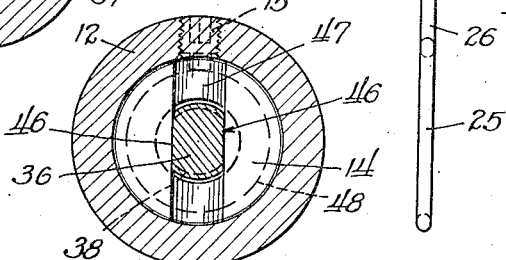
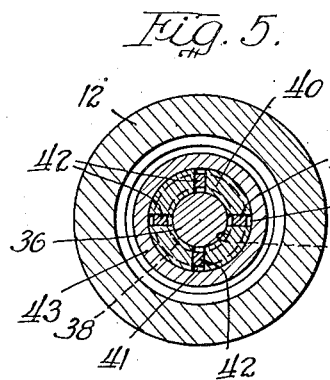
Inventor:
Harold R. Forsmark
By Brown, Jackson,
Boettcher & Dienner
Attys.

Patented Dec. 14, 1948

2,456,497

UNITED STATES PATENT OFFICE 2,456,497

MICROMETER BORE GAUGE

Harold R. Forsmark, Chicago, Ill., assignor to Stiger Precision Products, Inc., Chicago, Ill., a corporation of Illinois Application March 1, 1947, Serial No. 731,736

2 Claims. (Cl. 33—178)

My invention relates, generally, to gage constructions and it has particular relation to the construction of gages for measuring accurately the diameter of bores, such as bores in metal blocks and the like.

In measuring the diameter of a bore in a metal block at a substantial depth, it is conventional to use a telescoping gage to obtain a length which can be measured separately by an outside micrometer. This procedure is objectionable for several reasons. It is necessary to provide some clearance to permit removal of the telescoping gage from the bore. The length corresponding to the diameter being measured is reduced by about .0002 inch and allowance must be made for such reduction in determining the actual bore diameter. Two operations are required to measure the bore diameter when this procedure is followed. This increases the time required for obtaining the measurement. Two different instruments are required for performing such operations.

Accordingly, among the objects of my invention are: To overcome the foregoing and other objections in the measurement of the diameter of bores; to provide a direct reading of the bore diameter in a single operation; to provide indicia on the barrel and thimble of the gage that are relatively far apart so as to facilitate reading of the same; to move a pair of balls apart to contact the bore surface for adjusting the gage to make the bore measurement; to prevent the balls from escaping while permitting free movement thereof within the range of the gage without peening or otherwise deforming the head that holds the balls; and to permit operation of the gage by one hand.

Other objects of my invention will, in part, be obvious and in part appear hereinafter.

My invention is disclosed in the embodiments thereof shown in the accompanying drawing, and it comprises the features of construction, combination of elements, and arrangement of parts which will be exemplified in the construction hereinafter set forth, and the scope of the application of which will be indicated in the appended claims.

For a more complete understanding of the nature and scope of my invention, reference may be had to the following detailed description, taken together with the accompanying drawing in which:

Figure 1 is a view showing my improved bore gage held in the hand of an operator and inserted in a bore for measuring the diameter thereof;

Figures 2, 3 and 4 are detail sectional views, taken along the lines 2—2, 3—3 and 4—4 of Figure 1;

Figures 5 and 6 are detail sectional views, taken along the lines 5—5 and 6—6 of Figure 2; and Figure 7 is a detail sectional view of a modified end portion of my improved bore gage taken at right angles to the section shown in Figure 2.

Referring now particularly to Figure 1 of the drawing, it will be noted that the reference character 8 designates, generally, a bore gage in which my invention is embodied. The gage 8 is shown in operative position for measuring the diameter of a bore 9 in a block or shell 10. For illustrative purposes, it may be assumed that the nominal diameter of the bore 9 is one-half inch and that the gage 8 is intended to measure diameters ranging above and below one-half inch by .050 inch or thereabout. It will be understood different gages are provided for use in measuring the diameters of larger or smaller bores. It is with this understanding that various dimensions are referred to herein as being applicable to the construction of a gage for measuring bore diameters which nominally are close to one-half inch. For measuring other diameters the gage dimensions in some or all respects will be correspondingly different.

As shown in the drawing, the gage 8 includes a barrel or tubular body 11 which may have an external diameter of ½ inch. It may be formed of suitable steel rod stock. A thimble or ferrule 12 of similar material is threaded on the barrel or tubular body 11 and it is knurled, as indicated at 13, to facilitate its being gripped by the forefinger and thumb of an operator. At the end of the thimble or ferrule 12 there is provided an adjusting sleeve 14, the function of which will be described presently. The adjusting sleeve 14 may be secured to the thimble or ferrule 12 by means of a dog point socket set screw 15. The outer end of the adjusting sleeve 14 may be closed by a knurled cap 16, which, as will appear hereinafter, is threaded into the same.

The barrel or tubular body 11 is provided with indicia or calibrating marks 17 with which indicia or calibrating marks 18 on the thimble 12 cooperate. The pitch of the threaded engagement between the barrel or tubular body 11 and the thimble or ferrule 12 is so chosen that the indicia 17 and 18 can be spaced relatively far apart so as to facilitate inspection and reading thereof. The manner in which this may be accomplished will be set forth presently.

The contact engagement with the inner surface of the bore 9 to measure its diameter is accomplished by two spherical balls 21 each of which may have a diameter of 7/32 inch. The balls 21 are mounted for movement toward and away from each other in a transverse cylindrical opening 22 in a head 23. The diameter of the opening 22 is slightly greater than the diameter of the balls 21 so as to provide the necessary clearance for permitting free longitudinal movement thereof. The external diameter of the head 23 is equal to the external diameter of the barrel or tubular body 11 so that, in effect, it constitutes a longitudinal extension thereof. The head 23 preferably is formed of hardened steel which cannot be deformed by peening or otherwise for holding the balls 21 therein without disturbing the accuracy of the head 23. It is within the scope of my invention to employ pins with hemispherical ends instead of the balls 21 for measuring the diameter of bores that are substantially larger than the bore 9, for example, for the measurement of bores having a nominal diameter of two inches or more.

Surrounding the barrel or tubular body 11 is a clamp ring 24 to which a ring 25 may be adjustably secured. The ring 25 has an integrally formed shank 26 that, as shown in Figure 4, may be positioned between the outwardly extending ends of the ring 24 and securely clamped in place by a clamp screw 27. By loosening the screw 27, it is possible to adjust the position of the ring 25 to suit the convenience of the operator. The provision of the ring 25 permits the operator to hold the gage 8 with one hand and at the same time to adjust the thimble or ferrule 12 by the forefinger and thumb as illustrated in Figure 1.

The clamp ring 24 has another function. It serves as a stop for the forward movement of the thimble or ferrule 12 and thus prevents the balls 21 from being forced out of the head 23.

In Figure 2, the internal details of construction of the gage 8 are shown more clearly. It will be noted that the head 23 has an integrally formed reduced diameter hollow portion 31 that has external threads 32 for cooperation with internal threads 33 of the barrel or tubular body 11.

Since the diameter of the transverse cylindrical opening 22 in the head 23 is slightly greater than the diameter of the balls 21, it is necessary to provide means for preventing the balls 21 from escaping. At the same time the means which is provided for performing this function must not interfere with the free movement of the balls 21 in the calipering of a bore. For this purpose the outer end of the barrel or tubular body 11 is undercut as indicated at 34, so as to provide a lip 35 which extends a slight distance into the transverse cylindrical opening 22 at each end, and thus into the paths of outward movement of the balls 21. This lip 35 is sufficient to prevent loss of the balls 21 from the transverse cylindrical opening 22. At the same time it does not interfere with their free movement within the range of the gage. Moreover, there is no change in the external diameter of the barrel or tubular body 11 or of the head 23.

The balls 21 are moved apart by a rod 36 that has a conical end 37 for engaging the juxtaposed surfaces of the balls 21 as shown in Figure 2. Because of the wear incident to the movement of the balls 21, it is preferable that the conical end or tip 37 be hardened or that a separate carbide tip be provided on the end of the rod 36. The end of the rod 36 adjacent the conical end or tip 37 extends through the reduced hollow portion 31 of the head 23. The intermediate portion of the rod 36 is threaded as indicated at 38. The thread 38 is relatively fine. For example, there may be 56 threads to the inch. The fine thread 38 promotes the accuracy in the movement of the balls 21 and permits relatively fine adjustment of their positions. The barrel or tubular body 11 is internally threaded, as indicated at 39, for cooperating with the threaded section 38 of the rod 36. The barrel or tubular body 11 is provided with a threaded reduced extension 40 that is slotted, as indicated at 41, which is illustrated more clearly in Figure 5. Shims 42 of compressible material are provided in the slots 41 and an adjusting nut 43 is threaded on the extension 40. It will be observed that the extension 40 is conical in shape so that when the adjusting nut 43 is tightened thereon, the portions of the extension 40 between the slots 41 will be moved inwardly slightly. The purpose of this construction is to compensate for wear of the threads 38 and 39 which results from repeated use of the gage after it has been in operation for some time.

The barrel or tubular body 11 is provided with external threads 44 for cooperating with internal threads 45 on the thimble or ferrule 12. These threads are relatively coarse for the reason indicated hereinbefore. For example, there may be ten threads double per inch.

Because of the difference in pitch between the threads on the rod 36 and the threads of the thimble or ferrule 12, provision must be made for permitting relative longitudinal movement therebetween. This is accomplished in accordance with my invention by providing flat portions 46 on opposite sides of the outer end of the rod 36. These sides interfit with a transverse slot 47, Figure 6, in the adjusting sleeve 14 so that when the latter is turned, the rod 36 also is turned but longitudinal relative movement therebetween is permitted. It will be observed that the point of the set screw 15 projects into an annular slot 48 in the adjusting sleeve 14. The set screw 15 serves to hold the sleeve 14 in fixed relation with respect to the thimble or ferrule 12. Initially relative movement therebetween is required in order to permit the proper calibration of the gage 8 so that the distance between the outermost points of the balls 21 will be indicated accurately by the indicia 17 and 18. For example, assuming that a calibrated bore that is known to be of one-half inch diameter is employed, the rod 36 may be rotated by the adjusting sleeve 14 with the set screw 15 loose until the balls 21 engage the standard bore. Then the thimble or ferrule 12 is adjusted until the zero mark of the indicia 18 registers with the point .500 mark of the indicia 17. Thereupon the set screw 15 is operated to securely clamp the adjusting sleeve 14 to move with the thimble or ferrule 12.

As shown in Figure 2, the cap 16 has a longitudinal axial aperture 49 therein to receive the flat end 46 of the rod 36. The cap 16 has external threads 50 that interfit with internal threads 51 at the outer end of the adjusting sleeve 14.

When the forward end of the adjusting sleeve 14 engages the rear end of the extension 40 of the barrel or tubular body 11, the former cannot be rotated further to cause additional forward rotation of the rod 36. Thus, if the clamp ring 24 is omitted or is improperly placed so that it does not function as a stop as described hereinbefore, the rod 36 cannot be moved forwardly to such an extent that it will force the balls 21 past the lip 35 and permit them to escape from the cylindrical opening 22 in the head 23.

In Figure 7 of the drawing, a modified construction of the forward end portion of the gage is shown. An extension 52 of the barrel or tubular body 11' may be provided so that together they form the equivalent of the barrel or tubular body 11 previously described. The barrel 11' has internal threads 53 for cooperating with external threads 54 on the extension 52 to permit joining of these parts together.

One reason for the construction just described is to permit the use of certain of the parts making up the gage 8 for the various sizes thereof. The same barrel or tubular body 11', thimble or ferrule 12, adjusting sleeve 14 and cap 16 can be used for a wide range of sizes of the gage. In general the parts that are individual to a particular gage size are: the head 23 or 23', the balls 21, the rod 36 and the extension 52.

The head 23' shown in Figure 7 is different from the head 23 described previously in that it has a bevel face 55 which intersects the cylindrical opening 22 rather than a flat radial face as is the case for the head 23. The extension 52 has a corresponding bevel face 56 which engages the face 55 and a portion thereof, corresponding to the lip 35, projects into the ends of the cylindrical opening 22 and serves to prevent the balls 21 from escaping. This construction, of course, can be used for the head 23 and the barrel or tubular body 11 shown in Figures 1 and 2.

Since certain changes can be made in the foregoing construction and different embodiments of the invention can be made without departing from the spirit and scope thereof, it is intended that all matter shown in the accompanying drawing, and described hereinbefore shall be interpreted as illustrative and not in a limiting sense.

I claim as my invention:

1. A bore gage comprising, in combination, a cylindrical tubular body internally threaded at one end and externally and internally threaded at the other end, a cylindrical head having a diameter equal to that of said body and a reduced hollow externally threaded portion for entering said one end of said body whereby the head constitutes a cylindrical extension of said body, said head having a transverse cylindrical opening therein, a pair of balls having diameters slightly less than that of said cylindrical opening, movable apart therein to project beyond said head for engaging the surface of said bore, the end of said body adjacent said head being undercut to provide a circumferential lip abutting said head and intersecting said cylindrical opening therein to prevent said balls from escaping therefrom, a rod axially disposed within said body and hollow portion of said head and cone shaped at one end for engaging said balls to move the same apart, said rod being threaded intermediate its ends for engagement with the internal threads at the other end of said body and having the other end flattened on two opposite sides and projecting from said body, an internally threaded thimble threaded on said other end of said body, an adjusting sleeve secured to the outer end of said thimble and having a slotted opening slightly greater in width than the distance between said flattened sides of said rod for receiving and rotating the same on rotation of said thimble while permitting relative longitudinal movement therebetween, and indicia on said body and sleeve to indicate the diameter of the bore being gaged.

2. Adjusting means for a micrometer comprising, in combination, a barrel having internal and external threads, a rod threaded in said internal threads and constituting a movable measuring element of the micrometer, one end of said rod having parallel sides and extending beyond one end of said barrel, a thimble threaded on said external threads of said barrel, and an adjusting sleeve movable with said barrel and having a slotted opening slightly greater in width than the distance between said parallel sides of said rod for receiving and rotating the same on rotation of said thimble while permitting relative longitudinal movement therebetween.

HAROLD R. FORSMARK.

REFERENCES CITED

The following references are of record in the file of this patent:

UNITED STATES PATENTS

| Number | Name | Date |
| --- | --- | --- |
| 890,590 | Anderson | June 16, 1908 |
| 965,844 | Cunningham | July 26, 1910 |
| 1,311,548 | Blush | July 29, 1919 |
| 1,547,668 | Poltin | July 28, 1925 |
| 1,695,453 | Carpenter | Dec. 18, 1928 |
| 2,019,287 | Bates | Oct. 29, 1935 |
| 2,134,372 | Olson | Oct. 25, 1938 |
| 2,316,877 | Maag | Apr. 20, 1943 |
| 2,329,067 | Maag | Sept. 7, 1943 |
| 2,369,319 | Smith | Feb. 13, 1945 |